(12) United States Patent
Pickard et al.

(10) Patent No.: US 11,666,878 B2
(45) Date of Patent: Jun. 6, 2023

(54) AUTOCLAVE SYSTEM AND METHOD

(71) Applicant: The Leeds and Bradford Boiler Company Limited, Pudsey (GB)

(72) Inventors: Howard Pickard, Pudsey (GB); Kyle Pickles, Pudsey (GB)

(73) Assignee: The Leeds and Bradford Boiler Company Limited, Pudsey (GB)

( * ) Notice: Subject to any disclaimer, the term of this patent is extended or adjusted under 35 U.S.C. 154(b) by 280 days.

(21) Appl. No.: 16/617,142

(22) PCT Filed: May 30, 2018

(86) PCT No.: PCT/GB2018/051470
§ 371 (c)(1),
(2) Date: Nov. 26, 2019

(87) PCT Pub. No.: WO2018/220367
PCT Pub. Date: Dec. 6, 2018

(65) Prior Publication Data
US 2020/0147568 A1    May 14, 2020

(30) Foreign Application Priority Data
May 31, 2017 (GB) ...................................... 1708641

(51) Int. Cl.
*B22D 29/00* (2006.01)
*B01J 3/02* (2006.01)
(Continued)

(52) U.S. Cl.
CPC ................. *B01J 3/04* (2013.01); *B01J 3/002* (2013.01); *B01J 3/02* (2013.01); *B01J 3/042* (2013.01); *B01J 3/044* (2013.01); *B01J 3/046* (2013.01); *B22D 29/002* (2013.01); *F28D 7/0066* (2013.01); *B01J 2219/0009* (2013.01);
(Continued)

(58) Field of Classification Search
None
See application file for complete search history.

(56) References Cited

U.S. PATENT DOCUMENTS 5,332,023 A * 7/1994 Mills .................... B22D 29/002
                                                    134/2
6,354,310 B1 * 3/2002 Farr ....................... B08B 7/0021
                                                    134/105
(Continued)

FOREIGN PATENT DOCUMENTS

JP          H06 174196 A     6/1994
WO       WO 03/106123 A2    12/2003

*Primary Examiner* — Jennifer A Leung
(74) *Attorney, Agent, or Firm* — Occhiuti & Rohlicek LLP

(57) ABSTRACT

An autoclave system comprises an autoclave vessel 210, for performing a leaching operation on sacrificial ceramic cores (not shown) and a storage vessel 220 for containing caustic leaching fluid 230. Interposed in a fluid flow path between the vessel 210 and the tank 220 is a heat exchange unit 240, comprising a body 250 containing a thermal exchange medium, in the form of water 260, and first and second thermal exchange conduits represented at 270 and 280. A thermal exchange medium inlet pipe 290*a* and a thermal exchange medium outlet pipe 290*b* are provided to the body so that the medium 260 can be replenished, preferably substantially continuously, to optimize thermal transfer efficiency.

5 Claims, 5 Drawing Sheets

(51) Int. Cl.
*B01J 3/04* (2006.01)
*F28D 7/00* (2006.01)
*B01J 3/00* (2006.01)
F28D 1/02 (2006.01)
F28D 7/02 (2006.01)

(52) U.S. Cl.
CPC ..... *B01J 2219/00083* (2013.01); *F28D 1/024* (2013.01); *F28D 1/0213* (2013.01); *F28D 7/024* (2013.01)

(56) References Cited

U.S. PATENT DOCUMENTS

| | | | |
|---|---|---|---|
| 6,739,380 B2 * | 5/2004 | Schlienger | B22D 29/002 134/105 |
| 8,409,493 B2 * | 4/2013 | Schlienger | B22D 29/002 266/88 |
| 8,828,214 B2 * | 9/2014 | Smallwood | B22D 29/002 205/187 |
| 2005/0077032 A1 | 4/2005 | Johnson | |
| 2015/0021007 A1 | 1/2015 | Snaith et al. | |

* cited by examiner

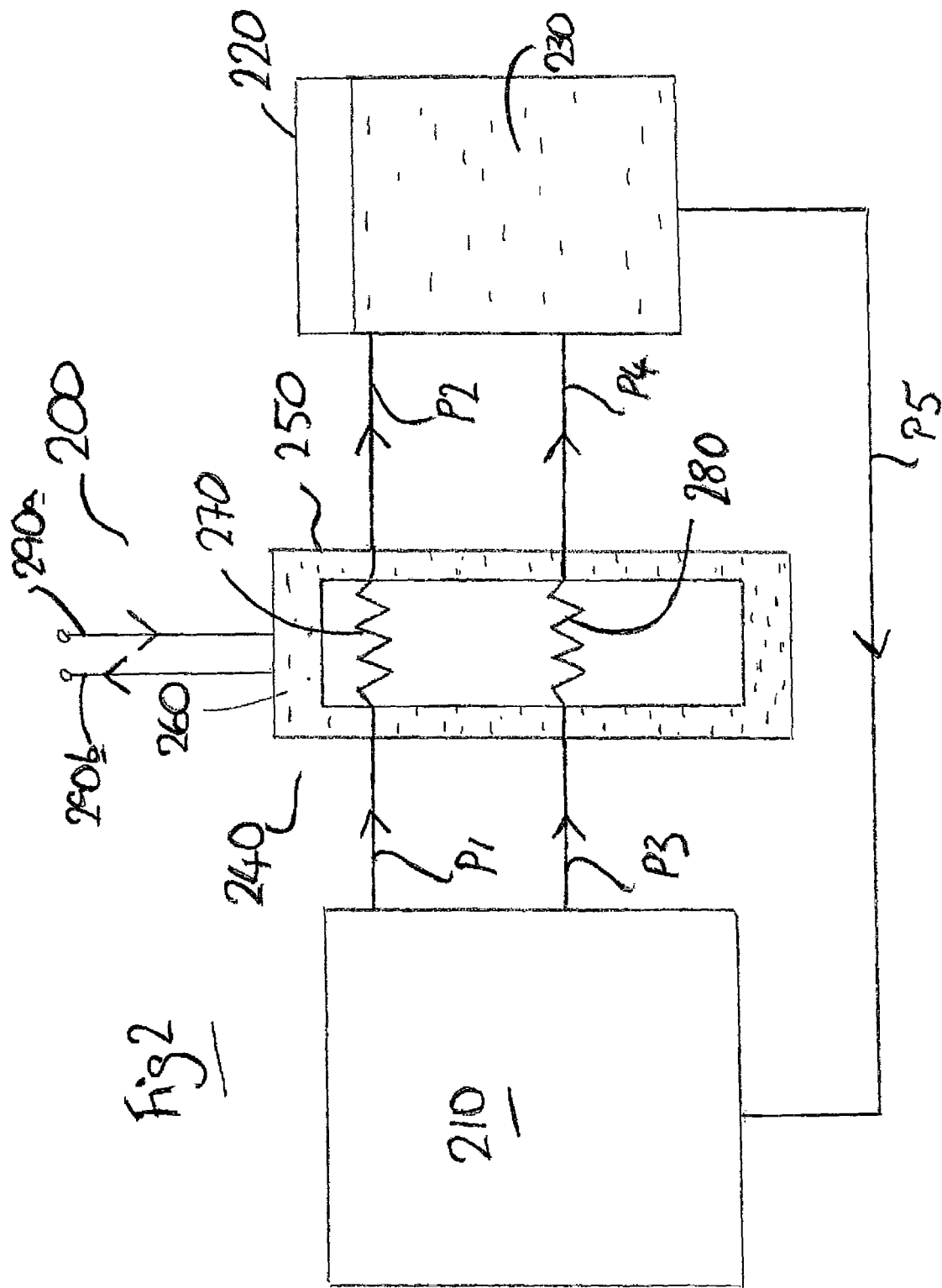

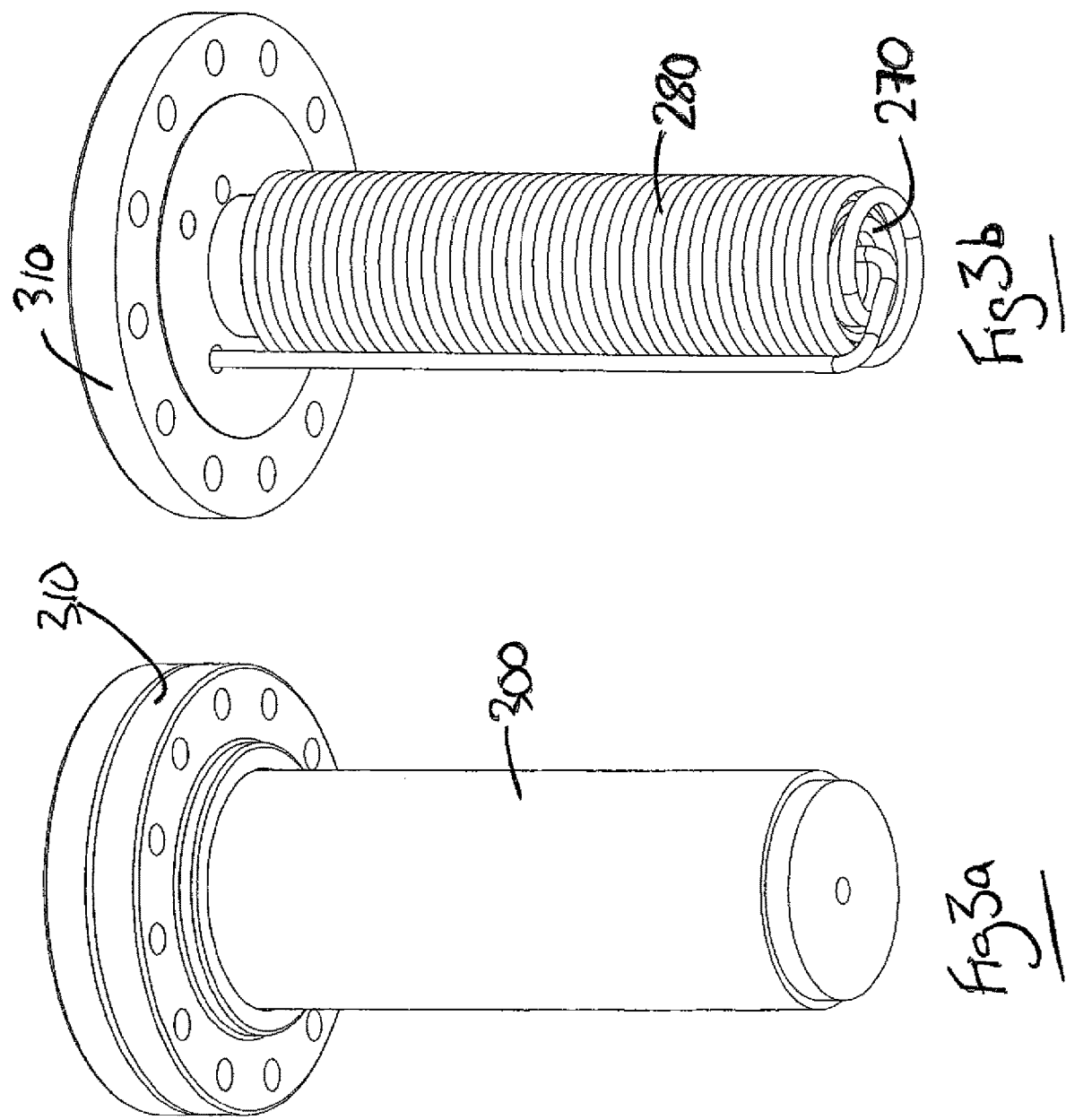

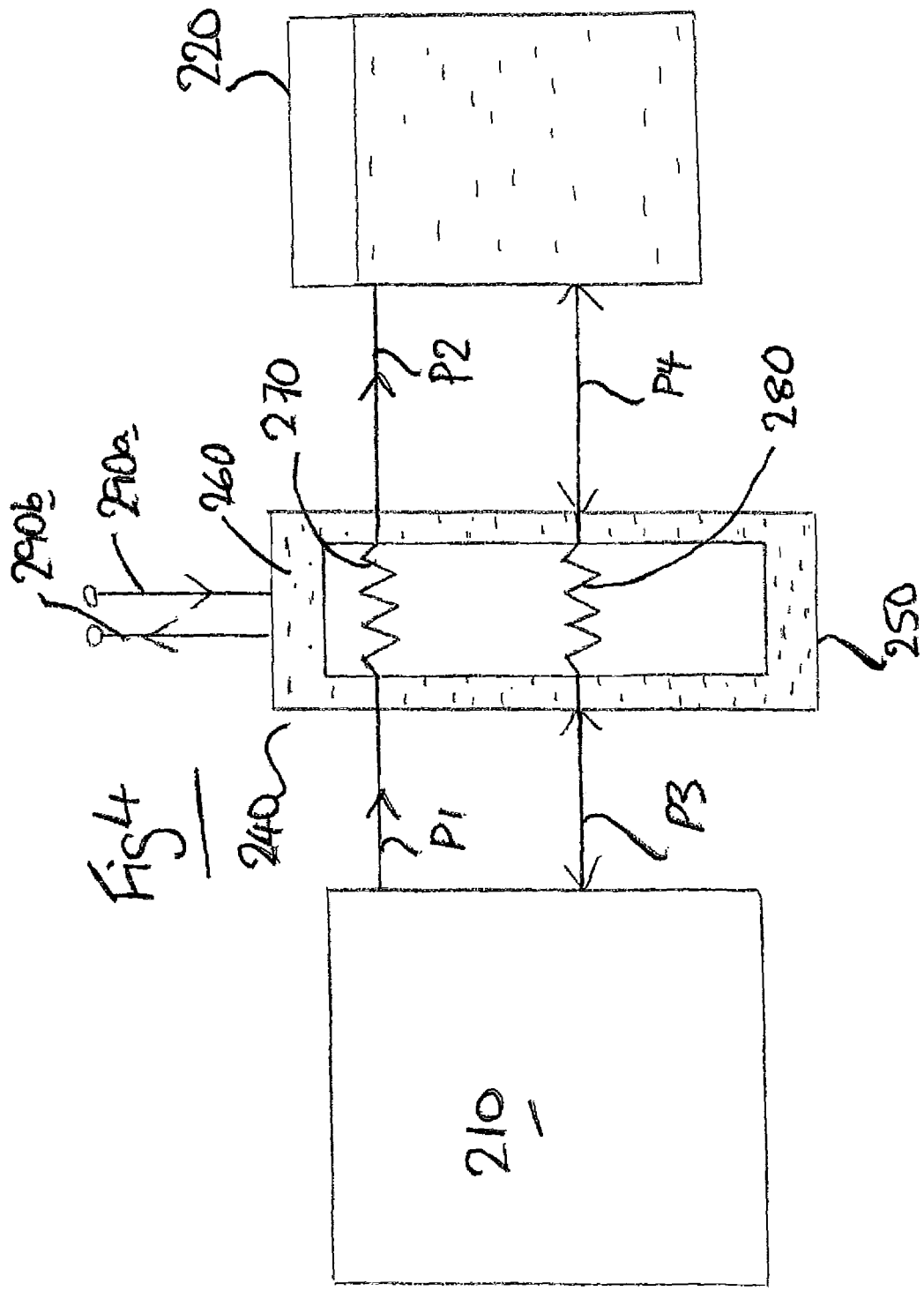

AUTOCLAVE SYSTEM AND METHOD

CROSS-REFERENCE TO RELATED APPLICATIONS

This application is the US National Stage of International Application No. PCT/GB2018/051470, filed on May 30, 2018, which claims the priority of GB Application No. 1708641.4 filed on May 31, 2017.

The present invention relates to an autoclave system and to a method of operating an autoclave system, and is concerned particularly, though not exclusively, with a leaching autoclave system and a method of operating the same.

An autoclave is a pressure vessel used in various processes usually requiring the applications of high pressures and/or temperatures to treat physically, and/or chemically, an article such as a component, instrument or workpiece.

In some applications the operation of the autoclave is to cause the dissolution or degradation of sacrificial ceramic structures, known as cores, used in the precision casting of fine components, such as turbine parts for aviation engines, where these cannot be removed from the finished component intact. To achieve this, the component is placed inside an autoclave vessel and a solution that is destructive (usually caustic) to the ceramic core is introduced. Using a combination of pressure and temperature, the caustic solution inside the autoclave is made to boil violently, and thus to agitate, and ultimately dissolve, the ceramic core, in a process known as "leaching". The caustic solution is then discharged to a supply tank so that the component can be removed from the autoclave, before repeating the cycle with a new component, using solution from the tank.

Gas, such as nitrogen or air, is used to selectively pressurize the vessel, so as to control the boiling of the leaching solution therein. This is sometimes referred to as the pressurizing or venting gas.

FIG. 1 shows schematically, generally at 100, a leaching autoclave system, in which an autoclave vessel 110 communicates fluidically with a storage tank 120. First and second discharge pipes 130 and 140 respectively convey vented gas and/or vapour and used leaching fluid from the autoclave vessel 110 to the tank 120, at the end of a leaching cycle. A charging pipe 150 conveys leaching fluid from the tank 120 to the vessel 110 in preparation for the next leaching cycle.

The casting techniques and the component structures themselves continue to evolve in complexity, and so the ceramic material used in the core has been developed accordingly. As a result, leaching operations tend towards ever-greater pressures and temperatures.

Furthermore, the cycling of increasing and decreasing pressures within the autoclave requires a periodic venting of gas, which may include potentially hazardous entrained vapour. Rapid dissipation of energy into the tank can also be hazardous.

Both the extracted leaching liquid and the vented gas are typically returned to a storage vessel which contains a reservoir volume of the leaching fluid at a lower temperature and pressure. As the returning fluids are introduced into the tank, sometimes through a pressure-dissipating pipe— known as a "sparge pipe", their energy reduces. However, with successive cycles of charging and discharging the autoclave vessel the temperature of the reservoir increases. After a number of cycles, the temperature reaches a level at which a hazard risk is presented.

When seeking to accommodate increased temperatures and pressures in the leaching process it has previously been considered to simply increase the volume of the reservoir. However, as well as being impractical, and undesirable for reasons of space, this approach fails to address another problem, which is that of excessive noise being generated when the fluids are reintroduced to the tank, in part due to the rapid expansion of gas and localized boiling of reservoir liquid.

Embodiments of the present invention aim to address at least partly the aforementioned problems.

The present invention is defined in the attached independent claims, to which reference should now be made. Further, preferred features may be found in the sub-claims appended thereto.

According to one aspect of the present invention, there is provided a heat exchanger for use with an autoclave vessel arranged in use to communicate fluidically with an external support system, the heat exchanger being arranged in use to be located in a fluid flow path between the autoclave vessel and the external support system, and to be fluidically connected to each, the heat exchanger comprising a body and a thermal exchange conduit located within the body arranged in use to convey fluid between the autoclave vessel and the support system, the body being arranged in use to contain a thermal exchange medium for at least partly surrounding the conduit so as to facilitate the transfer of heat energy between fluid in the conduit and the thermal exchange medium outside the conduit in use, wherein a leaching fluid and a pressurizing/venting fluid are arranged to be separately conveyed between the autoclave vessel and the external support system, and at least one of the leaching fluid and the pressurizing/venting fluid is conveyed through the thermal exchange conduit.

Preferably the conduit is arranged in use to convey leaching fluid for use in a leaching operation in an autoclave vessel.

Alternatively or additionally the conduit is arranged in use to convey venting fluid from an autoclave vessel.

Accordingly, the conduit may comprise a first conduit pathway arranged in use to convey leaching fluid between an autoclave vessel and an external support system. The conduit may comprise a second conduit pathway arranged in use to convey venting fluid from an autoclave vessel to an external support system. In a preferred arrangement the conduit comprises first and second conduit pathways.

The first conduit pathway is preferably arranged in use to convey leaching fluid discharged from an autoclave vessel to an external support system, and may convey leaching fluid from an external support system to an autoclave vessel. The heat exchanger may comprise a heater for heating the leaching fluid prior to charging of an autoclave vessel, either directly or indirectly via the thermal exchange medium.

The external support system may comprise a supply of fluid and/or an outlet for discharged fluid. In a preferred arrangement the external support system comprises a storage tank for storing fluid.

The body is preferably constructed so as to withstand super-atmospheric pressure. In a preferred arrangement the body comprises valving to allow control of the thermal transfer medium into and/or out of the body.

Preferably the body is arranged in use to contain a thermal transfer medium in the form of a liquid. The thermal transfer medium may comprise water, and more preferably may comprise liquid water.

In a preferred arrangement the first conduit pathway and/or the second conduit pathway comprise one or more tubes. The, or each tube may be substantially helical. The or each tube may be in thermal contact with the exchange medium, and more preferably may be at least partly or substantially surrounded by, and/or at least partly or substantially immersed in, the exchange medium.

The invention also includes a leaching autoclave system comprising a heat exchanger according to any statement herein. The system may comprise an autoclave vessel and may comprise an external support system which may include a storage tank, with one or both of the vessel and support system being arranged in fluidic communication with the heat exchanger, which is located separately.

According to another aspect of the present invention, there is provided a method of operating a leaching autoclave system, the method comprising discharging fluid from an autoclave vessel to an external support system through a heat exchanger to reduce the temperature of the fluid, wherein the method comprises conveying separately a leaching fluid and a pressurizing/venting fluid from the autoclave vessel to the external support system, at least one of the leaching fluid and the pressurizing/venting fluid being conveyed through a thermal exchange conduit of the heat exchanger.

The method may comprise passing the discharge fluid through the conduit of the heat exchanger, which conduit is in thermal contact with a thermal transfer medium.

The method may comprise passing a first component of discharging fluid through a first conduit pathway to reduce the temperature of the first component, the first component comprising a leaching fluid. Alternatively, or in addition, the method may comprise passing a second component of discharging fluid through a second conduit pathway to reduce the temperature of the second component, the second component comprising pressurizing/venting fluid. The first component of fluid may comprise a liquid component and the second component may comprise a gaseous component.

The method may comprise heating a leaching fluid in the heat exchanger prior to charging an autoclave vessel for a leaching operation. The method may comprise heating the leaching fluid by heating a thermal exchange medium of the heat exchanger.

In a preferred arrangement, the method includes charging and discharging the autoclave with leaching fluid through the same conduit, more preferably the same conduit pathway, in the heat exchanger.

The invention may include any combination of the features or limitations referred to herein, except such a combination of features as are mutually exclusive, or mutually inconsistent.

A preferred embodiment of the present invention will now be described, by way of example only, with reference to the accompanying diagrammatic drawings, in which:

FIG. 2 shows schematically a leaching autoclave system according to an embodiment of the present invention;

FIGS. 3a to 3d show, respectively: in perspective view, in perspective view with a body removed, in sectional view, and in part-cutaway perspective view from above, a heat exchanger for use in the system according to FIG. 2; and FIG. 4 shows schematically a leaching autoclave system in accordance with another embodiment of the present invention.

Figure 1:
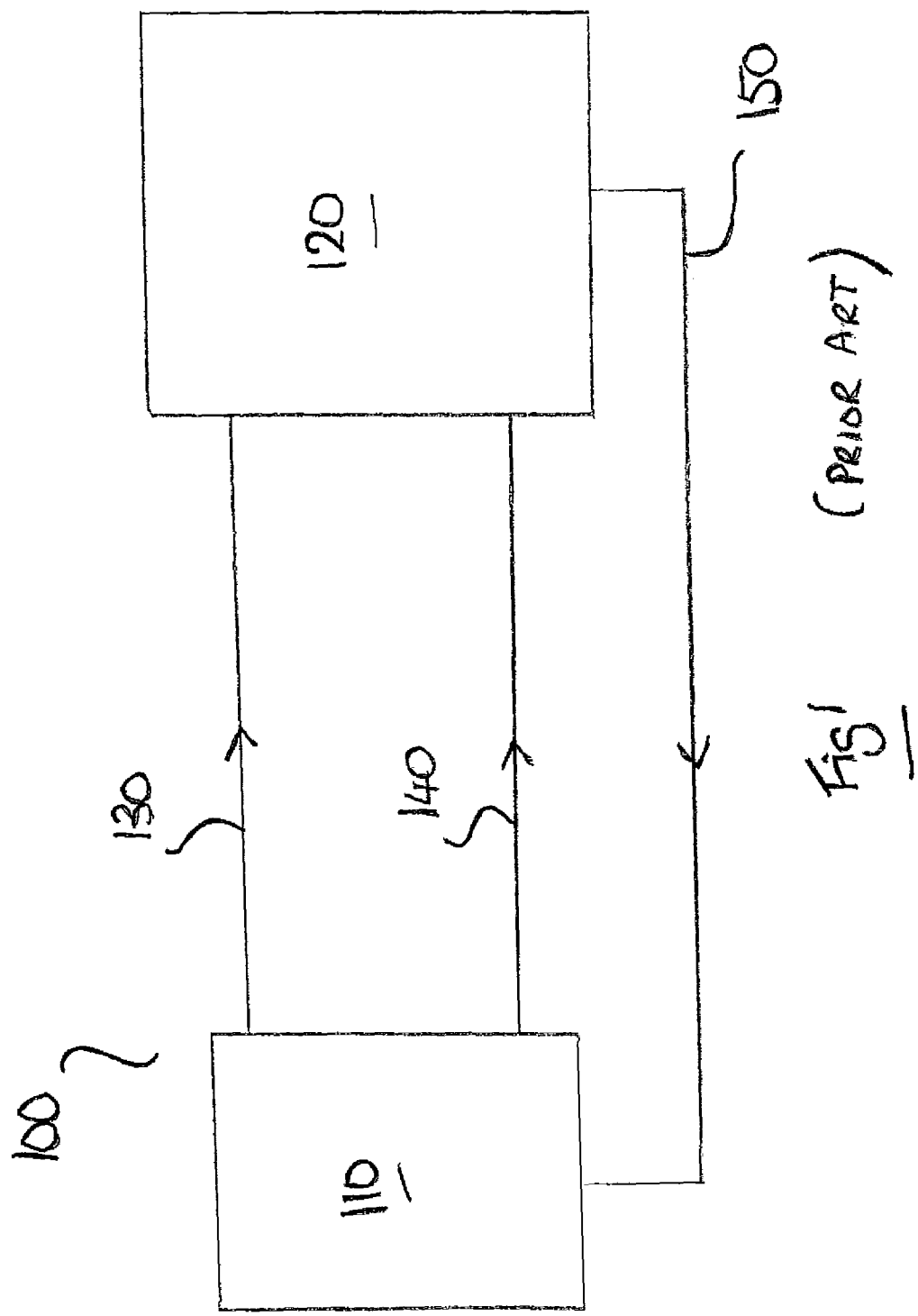
FIG. 1 shows schematically a previously considered leaching autoclave system.

Turning to FIG. 2, this shows generally at 200 an autoclave system according to an embodiment of the present invention. The system comprises an autoclave vessel 210, for performing a leaching operation on sacrificial ceramic cores (not shown) and a storage vessel 220 for containing caustic leaching fluid 230. Interposed in a fluid flow path between the vessel 210 and the tank 220 is a heat exchange unit 240.

The heat exchange unit 240 comprises a body 250 containing a thermal exchange medium, in the form of water 260, and first and second thermal exchange conduits represented at 270 and 280. A thermal exchange medium inlet pipe 290a and a thermal exchange medium outlet pipe 290b are provided to the body so that the medium 260 can be replenished, preferably substantially continuously, to optimize thermal transfer efficiency.

Pipe P1 conveys venting gas from the autoclave vessel 210 to the heat exchanger 240. The venting gas is cooled, and its pressure reduced, in the heat exchanger before being conveyed to the tank 220 by pipe P2.

Used leaching fluid is discharged from the vessel 210 to the heat exchanger via pipe P3, where it is cooled and its pressure reduced before being returned to the tank 220 via pipe P4, at the end of a leaching cycle. The leaching or caustic fluid may typically comprise a base liquid such as an aqueous solution of a hydroxide, more typically sodium or potassium hydroxide.

A further pipe, P5 conveys leaching fluid from the tank to charge the vessel 210 for the next leaching cycle.

Figure 3D:
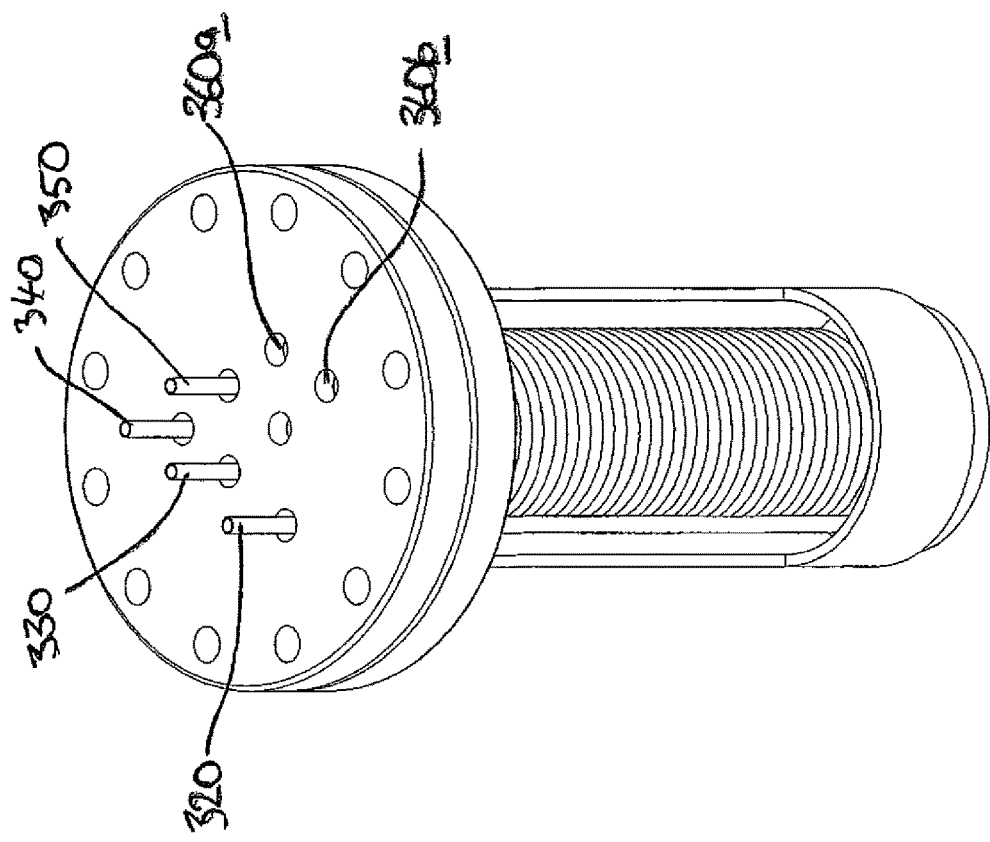
Figure 3C:
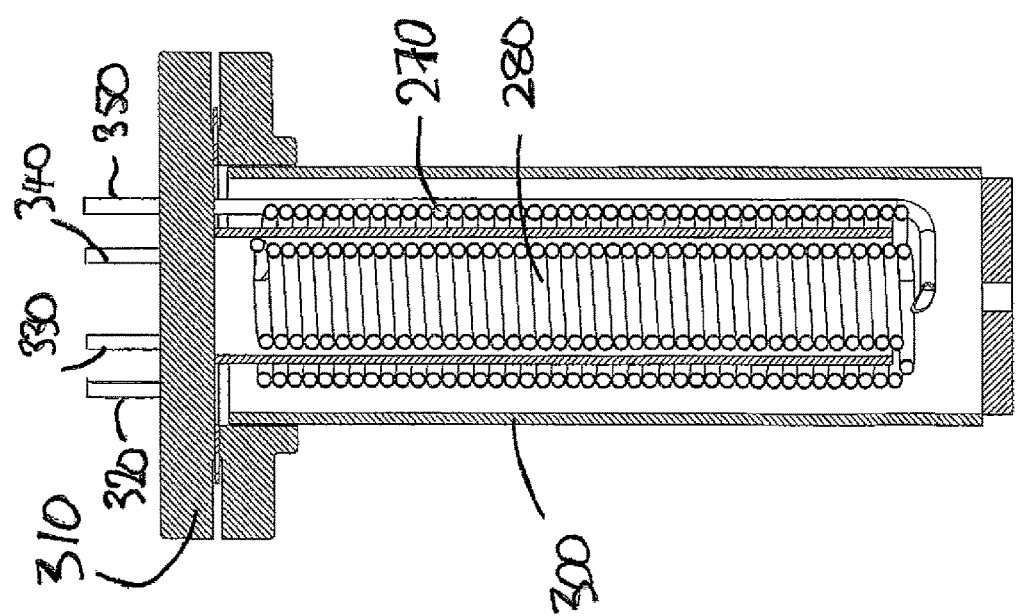

Turning now to FIGS. 3a to 3c, these show the heat exchanger unit 240 in more detail. The unit 240 comprises a substantially cylindrical body 300 of 316 Grade stainless steel, and head closure 310, constructed so that the unit is capable of withstanding super-atmospheric pressure. Inside the body are first and second thermal exchange conduits 270 and 280 in the form of substantially helical, coaxial, stainless steel alloy tubes (shown best in FIG. 3c). First and second inlets 320 and 330 are for connecting to pipes P1 and P3 respectively, and first and second outlets 340 and 350 are for connecting to pipes P2 and P4 respectively.

Apertures 360a and 360b, shown in FIG. 3d, are provided respectively to the (water) inlet and outlet pipes 290a and 290b shown in FIG. 2.

In use, during a leaching cycle the autoclave vessel 210 contains caustic leaching fluid at raised temperature and pressure. Typically the pressure inside the autoclave vessel may reach up to 30 bar and the temperature may reach 250C. The pressure is varied to cause the fluid in the tank to boil cyclically, so as to agitate the ceramic cores. At each periodic release of pressure the gas (typically air) inside the vessel is vented via pipe P1 to the heat exchanger 240. The hot, pressurized gas cools as it passes through the conduit 270, due to the conduit being surrounded by cooling fluid, so that when it reaches the tank 220 its energy has been substantially reduced (pressure and temperature have reduced).

Similarly, at the end of a leaching cycle the used leaching fluid is discharged up to a maximum temperature of 250 C, and/or up to a maximum pressure of 30 barg, from the vessel 210 through pipe P3 to the heat exchanger 240, where it passes through the conduit 280, thereby cooling it before passing through pipe P4 to the storage tank 220. The temperature in the tank 220 typically ranges between ambient and 60 C.

The use of the heat exchanger 240, as an intermediary between the autoclave vessel 210 and the storage tank 220 allows the latter to be kept at a modest size whilst still accommodating the returning leaching fluid and the pressurized venting gas.

Suitable valves are used to replenish the heat exchange medium (ie water), through inlet 290a and outlet 290b pipes, preferably substantially continuously as it becomes heated through contact with the conduits 270 and 280, so as to maintain the efficiency of the cooling.

FIG. 4 shows schematically another embodiment of the present invention. In this embodiment the heat exchanger 240 is used not only to cool the venting gas and the discharged leaching liquid, but is also used to pre-heat the leaching liquid from the tank at the next charging of the autoclave vessel 210.

To achieve the pre-heating the heat exchanger is provided with an electric heating device (not shown), such as a heating blanket around an external surface of the body, that heats the exchange medium surrounding the conduits 270 and 280. As stated above, the heat exchange unit 240 is rated at super-atmospheric pressure, so as to allow heating to the desired temperature. The leaching fluid passes from the tank 220 along the same path as it does when discharging from the vessel 210 but in reverse, so that it travels first through pipe P4, then through the conduit 270 and then via pipe P3 to the vessel 210.

There is no need for a separate charging pipe, and the arrows indicate a bi-directional flow in pipes P3 and P4.

Pre-heating the leaching fluid in this way makes for increased efficiency, since less energy is required to heat the liquid while in the autoclave vessel in order to attain its operating temperature.

In the above described embodiments both the leaching liquid and the pressurizing/venting gas are cooled in the heat exchanger. However, this does not have to be the case. Whilst the liquid and the gas should be conveyed separately between the autoclave vessel and the external support system, such as the tank, it may be sufficient to conduct only one through the heat exchanger. For example, it may be sufficient for only the leaching liquid to be conveyed through the thermal exchange conduit.

It will be understood by the skilled person that where the heat exchanger is described as being located or interposed between the autoclave vessel and the storage tank, this need not mean that the heat exchanger must occupy physical space between the other two. Rather, the heat exchanger need only be positioned on a flow path between them. The physical juxtaposition of the three vessels may be chosen according to available space and to maximise efficiency.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A method of operating a leaching autoclave system, the method comprising discharging a leaching fluid and a pressurizing/venting fluid from an autoclave vessel to a common fluid storage tank in an external support system through a heat exchanger to reduce the temperature of the leaching fluid and the pressurizing/venting fluid, wherein the method comprises conveying the leaching fluid from the autoclave vessel to the common storage tank through a first conduit extending from the autoclave vessel to the common storage tank and conveying the pressurizing/venting fluid from the autoclave vessel to the common storage tank through a second conduit, separate from the first conduit and extending from the autoclave vessel to the common storage tank, the first conduit and the second conduit passing through and configured to convey fluids through the heat exchanger, wherein the method includes charging and discharging the autoclave vessel with the leaching fluid through a first thermal exchange section of the first conduit extending through the heat exchanger.

2. The method according to claim 1, wherein the first thermal exchange section is in thermal contact with a thermal transfer medium.

3. The method according to claim 1, wherein the first conduit includes the first thermal exchange section extending through the heat exchanger, and the method comprises passing the leaching fluid through the first thermal exchange section of the first conduit to reduce the temperature of the leaching fluid.

4. The method according claim 1, wherein the second conduit includes a second thermal exchange section extending through the heat exchanger, and the method comprises passing the pressurizing/venting fluid through the second thermal exchange section of the second conduit to reduce the temperature of the pressurizing/venting fluid.

5. The method according to claim 1, wherein the method comprises heating the leaching fluid in the heat exchanger prior to charging the autoclave vessel for a leaching operation.

* * * * *